Figure 1:
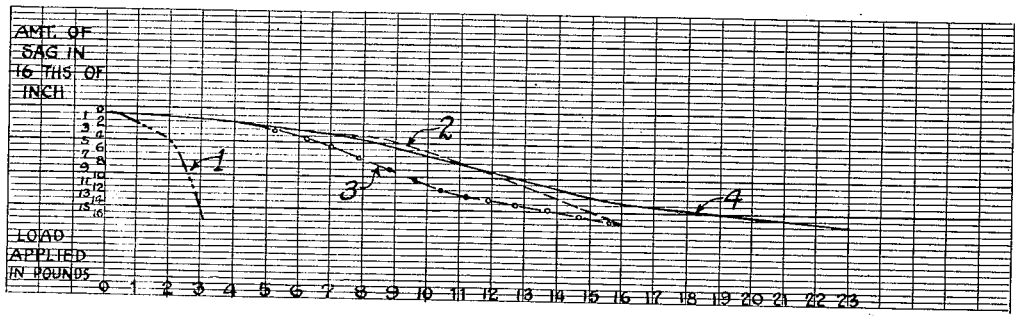

July 3, 1951

M. W. CATON 2,559,343

REFRACTORY MATERIAL

Filed Oct. 24, 1945

Inventor
Milton W. Caton

By Owen & Owen

Attorneys

Patented July 3, 1951

2,559,343

UNITED STATES PATENT OFFICE 2,559,343

REFRACTORY MATERIAL

Milton W. Caton, East Detroit, Mich., assignor to Champion Spark Plug Company, Toledo, Ohio, a corporation of Delaware Application October 24, 1945, Serial No. 624,283

2 Claims. (Cl. 106—44)

This invention relates to the making of a refractory material having unusual resistance to sag and unusual strength at high temperatures. The material is particularly useful for saggers or other refractory articles which are required to form a span and support a load at high temperatures.

This application is a continuation in part of applicant's prior application Serial No. 337,358, filed May 27, 1940, now abandoned.

More particularly, the invention relates to the improvement of refractories composed largely of alumina and containing a minor amount of silica.

In the patent to Frank H. Riddle for "Refractory Material and Batch and Method for Making the Same," No. 1,942,879, issued January 9, 1934, there is a disclosure of improved refractory material. In accordance with this disclosure, a refractory which is very strong at high temperatures may be produced by a combination of andalusite and alumina and also the usual alumina brick can be greatly strengthened by a proper proportion of beta alumina with alpha alumina. Mullite materials other than andalusite may be employed along with alumina to produce an improved refractory. In another patent to Frank H. Riddle for "Alumina and Silicon Carbide Refractory," issued October 30, 1945, Patent No. 2,388,080, there is disclosure of a very strong refractory which can be made by combining silicon carbide with a relatively large amount of alumina and a small amount of clay binder. In each of the cited Riddle patents, a grain size of 80 mesh and finer is specified.

The present invention relates to refractories of the type described, and to the still further strengthening of these refractories by the use of a small amount of mineralizer, or material which facilitates the growth of bonding mullite. While the employment of a mineralizer of proper kinds and proportions increases the strength at high temperatures of refractories produced with beta alumina in accordance with the above identified patent, the improvement is much more marked where alpha alumina is employed. Since the alpha alumina is usually more readily available and less costly than the beta alumina, it is a considerable commercial advantage to get results with alpha alumina nearly equal to those that have been obtained with beta alumina. It is still more advantageous where even better results can be obtained with alpha alumina than have heretofore been obtained with the use of beta alumina.

In the refractories to which this invention relates, it is found best to have compounds of silicon and aluminum in proportions which would give 12½ to 30 parts of $SiO_2$ to 87½ to 70 parts of $Al_2O_3$. The strongest refractories were found to be those containing 20 to 22½ of silica, the strength falling off markedly on both sides of this proportion, and being unsatisfactory below 12½ or above 30. Other refractory oxides may be present, either as impurities or intentional additions, but preferably not amounting to over 5% of the total.

The mineralizer which is added to facilitate the growth of bonding mullite may be a compound of one of the alkali metals lithium, sodium or potassium, or of the alkaline earth metals Be, Mg, Ca, Sr, or Ba. The amount should be not over 6 mols of the mineralizer calculated on $R_2O$ or $RO$, to 100 mols of the silicon content calculated as $SiO_2$, and should be as much as 2 mols of the mineralizer to 100 of $SiO_2$ in order to have an appreciable effect. An excess of the same compounds which act as mineralizers result in a decrease, rather than increase, of the bonding mullite, and lessen the resistance to sag.

Of the mineralizer compounds, the most desirable are the compounds of calcium, and the next most desirable are the compounds of sodium. The halogen compounds of the metals in question may be employed, but require care in their use. The same is true of sulphates. Silicates are not usually desirable. The preferred compounds are the aluminates, and next the oxides, hydroxides or carbonates. In general, it has been found undesirable to have over 5% by weight of the entire mix constituted by the mineralizing compound, even where more might be used without exceeding the above stated mol proportion.

Figure 2:
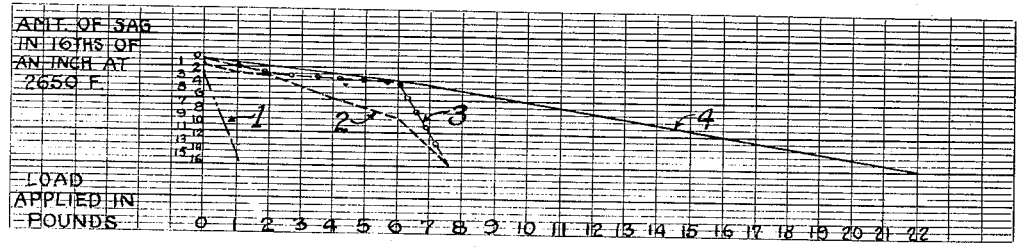
Figure 3:
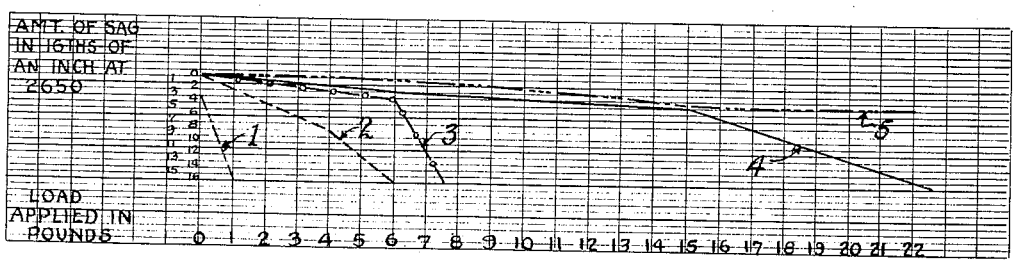

In the accompanying drawings forming part of this specification,

Figure 1 is a chart disclosing the relative sag at different loads at cone 16 (2650° F.) of refractories containing different amounts of the preferred mineralizer;

Fig. 2 is a chart disclosing the relative sag at specified loads at cone 16 (2650° F.), of refractories containing 5% of different calcium compounds as mineralizer; and Figure 3 is a chart disclosing the relative sag, at specified loads at cone 16 (2650° F.), of refractories containing preferred amounts of different sodium compounds as mineralizer.

Each of the charts illustrates tests made with test bars of different compositions. In each case the batch mixture was moistened so that it contained from 5% to 8% water, then the damp mixture was tamped into molds and thus formed into bars, which were fired at cone 16 (2650° F.). Each bar was 12 inches long, 2 inches wide, and ½ inch thick. Each bar was placed upon supports 11 inches apart, and then heated repeatedly to 2650° F., a load being placed on the center of the bar, and the sag at the center of the bar was measured.

This test measures directly the resistance of the refractory to sag, and it has been found that this test gives a good indication of the resistance of the refractory to distortion under compression or other stresses, and so is a good indication of the strength of refractories for most purposes.

In Fig. 1, there is shown at the left in sixteenths of an inch the amount of sag, while along the bottom line there is indicated the weight in pounds which was applied to the material. Line 1 discloses the action of a refractory material produced in accordance with the aforecited Patent 1,942,879 and comprising andalusite and alpha alumina. Line 2 shows the sag of a similar refractory bar produced from andalusite and the preferred proportion of alpha and beta alumina, as indicated in said Patent 1,942,879. Line 3 discloses the sag of a bar made exactly like the bar tested for line 1 except for the inclusion of 1% calcium aluminate, while line 4 indicates the sag of a bar made in the same way except with 2% calcium aluminate. From this chart it will be readily apparent that the addition of 1% calcium aluminate produces a product very similar to that resulting from the employment of beta alumina in accordance with the aforesaid patent, while the addition of 2% calcium aluminate produces an even stronger refractory.

The calcium aluminate employed in this test corresponded approximately to the formula

$$3CaO.Al_2O_3.6H_2O$$

An excessive amount of a mineralizer such as calcium aluminate decreases the sintering point of the refractory and thereby increases the sag at temperatures approaching the sintering point. It is preferred to use these mineralizers in amounts which do not materially decrease the sintering point of the refractory. Calcium aluminate is specified in the example given, but similar results may be obtained with other mineralizers. Calcium aluminate is preferred because it is easily added to the mix so that it is distributed uniformly, is readily controlled, and a wider range of amounts is permissible while obtaining substantially maximum results than is permissible with most of the other mineralizers which have been tested.

Among other mineralizers which have been used with success, but which are not as desirable as calcium aluminate for the reasons stated, are sodium aluminate, calcium fluoride, sodium fluoride, soda ash, whiting, hydrated lime, strontium carbonate, magnesium carbonate, barium carbon and dilute sodium silicate. Each of these mineralizers has been employed with beneficial results in refractories consisting essentially of alpha alumina with mullite, sillimanite, andalusite, cyanite or silicon carbide.

In Fig. 2, there are shown typical results of the use of various calcium mineralizers, in different amounts, upon the sag of bars tested in the same way as described in connection with Fig. 1. Line 1 indicates the sag with no mineralizer, line 2 with 5% of calcium sulphate, line 3 with 5% of calcium fluoride, line 4 with 5% of calcium carbonate.

Fig. 3 is like Fig. 2 except that it shows the results of the use of sodium compounds instead of calcium compounds. Line 1 shows the sag with no mineralizer, line 2 with 2% borax, line 3 with 1% soda ash, line 4 with 2% cryolite and line 5 with 2% sodium aluminate. It will be noted that the last mentioned mineralizer is very good, and may be preferred for some purposes, but it has some tendency to segregate, where the aluminate is rich in sodium. In the example given, the sodium aluminate corresponded approximately to the formula $NaO.Al_2O_3+30\%$ water. One of the difficulties with this material is its tendency to absorb water so that it is not so readily and evenly mixed with the other ingredients as a dry powder.

Other mineralizers mentioned above and also small quantities of spinel and Forsterite have been employed with beneficial results. In all cases, an amount should be used which is short of that which will materially reduce the softening point of the refractory. This amount will differ with the kind of mineralizer employed and with the purity of the mix to which it is added. Generally speaking, the more pure the original mix, the more mineralizer may be used without lowering the softening point. As will be seen from the above listed materials, the useful mineralizers appear to include compounds of the alkaline earth metals, sodium and silicon with alumina and with other materials which disappear during heating, leaving oxygen compounds of the various elements in the fired refractory body. But the aluminates of sodium and the alakline earths are preferred and of these calcium aluminate is preferred for general use and sodium aluminate for special conditions.

While the figures given above are directed to the amount of sag, it should be mentioned that the mineralizers employed in the described manner also definitely raise the weight necessary to break the refractory at elevated temperatures, the effect in this respect, as well as that upon the amount of sag before the breaking point is reached, depending upon the strength of the material without a mineralizer and upon the composition of the main batch and of the mineralizer; but it may be noted that a test bar such as described in connection with the sag tests, made of an alumina-andalusite mix that would break at 1 pound load at 2650° F. may be strengthened by the addition of 1% of calcium aluminate so that the breaking weight is increased to 4 pounds, while a similar mix breaking at 2 pounds without mineralizer broke at 15 pounds with 1% calcium aluminate and at 30 pounds with 2% calcium aluminate. As will be seen, the breaking strength of the material is increased at high temperatures by the mineralizer, not merely a few percent, but many fold, greatly decreasing the breakage of saggers, for example, when employed in kilns which are heated to such high temperatures.

In the specific examples given above, the same temperature was employed in each case in order to make the results properly comparable; but similar strengthening of the mineralizer at higher temperatures is realized. For example, at cone 30, bars made with andalusite and alpha alumina without mineralizer sagged 1 inch without load, whereas the sag with 4¼% sodium aluminate added was only 0.03125 inch. At cone 32, ½% calcium aluminate reduced by one-half the sag of an andalusite, alpha alumina and beta alumina bar, while 2% calcium aluminate reduced to 1/7 the sag of a bar of andalusite and alpha alumina without beta alumina. While the examples cited have been mixtures of andalusite with alpha alumina and/or beta alumina, similar results have been obtained with mixtures, with and without beta alumina, of alpha alumina with prefired mullite, with sillimanite, with cyanite, with dumortierite, and with silicon carbide. While the use of the mineralizer is helpful when beta alumina is present in the mix, the results are more marked with alpha alumina alone, since it brings the strength of such a mix approximately to that of a mix with both the beta alumina and the mineralizer.

Where silicon carbide is used with alumina, it is preferable to use between 11 and 29 parts of silicon carbide to 100 parts of alumina, both being calculated on the basis of the fine powder of that composition, disregarding any filler particles too coarse to affect the nature of the bonding material, as indicated in the above cited Patent 2,388,080.

While the strengthening against sag and breaking at high temperatures by the use of small amounts of mineralizers has been found effective with various refractories containing alumina as a major ingredient, it is especially satisfactory with refractories consisting chiefly of alumina and silicon carbide or alumina and mullite materials, that is, either preformed mullite or materials which are capable of forming mullite upon heating; and the mineralizer preferred is calcium aluminate.

What I claim is:

1. A sintered refractory span consisting of the fired product of a batch consisting of finely powdered alumina and aluminum silicate in proportions making the proportion of total alumina to total silica in the batch 7 parts of alumina to from 1 to 3 parts of silica, approximately 2 percent calcium aluminate, and not over 5% of other refractory oxides.

2. A sintered refractory span having high strength at high temperatures and formed by firing together a batch, at least 85% of which consisted of a mixture of silicon carbide and alumina with silicon carbide constituting 12½ to 30% of said mixture, and 2 to 6 mols of calcium aluminate to 100 mols of silicon carbide.

MILTON W. CATON.

REFERENCES CITED

The following references are of record in the file of this patent:

UNITED STATES PATENTS

| Number | Name | Date |
|---|---|---|
| 1,741,920 | Curtis | Dec. 31, 1929 |
| 1,744,547 | Hasselbach | Jan. 21, 1930 |
| 1,966,407 | Hauman | July 10, 1934 |
| 1,966,408 | Hauman | July 10, 1934 |
| 2,019,209 | Beuner et al. | Oct. 29, 1935 |
| 2,044,817 | Schroeder | June 23, 1936 |
| 2,195,950 | Wood | Apr. 2, 1940 |
| 2,246,226 | Walton | June 17, 1941 |
| 2,311,228 | Heany | Feb. 16, 1943 |
| 2,331,232 | Ross | Oct. 5, 1943 |
| 2,388,080 | Riddle | Oct. 30, 1945 |

OTHER REFERENCES

Ser. No. 269,236, Klingler (A. P. C.), published May 11, 1943.